United States Patent
Tang et al.

(10) Patent No.: US 11,108,511 B2
(45) Date of Patent: Aug. 31, 2021

(54) CARRIER SCHEDULING METHOD AND APPARATUS

(71) Applicant: Huawei Technologies Co., Ltd., Guangdong (CN)

(72) Inventors: Hao Tang, Shanghai (CN); Zhongfeng Li, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 20 days.

(21) Appl. No.: 16/403,261

(22) Filed: May 3, 2019

(65) Prior Publication Data
US 2019/0260529 A1 Aug. 22, 2019

Related U.S. Application Data

(63) Continuation of application No. PCT/CN2017/109354, filed on Nov. 3, 2017.

(30) Foreign Application Priority Data

Nov. 4, 2016 (CN) .................. 201610962707.X

(51) Int. Cl.
*H04W 4/00* (2018.01)
*H04L 5/00* (2006.01)
(Continued)

(52) U.S. Cl.
CPC .............. *H04L 5/0012* (2013.01); *H04L 5/00* (2013.01); *H04L 5/001* (2013.01); *H04L 5/0098* (2013.01);
(Continued)

(58) Field of Classification Search
None
See application file for complete search history.

(56) References Cited

U.S. PATENT DOCUMENTS

| 2011/0076962 A1 | 3/2011 | Chen et al. |
| 2011/0105050 A1 | 5/2011 | Khandekar et al. |

(Continued)

FOREIGN PATENT DOCUMENTS

| CN | 101790190 A | 7/2010 |
| CN | 101945403 A | 1/2011 |

(Continued)

OTHER PUBLICATIONS

Samsung, "UE specific search space design for cross-cell scheduling", 3GPP TSG RAN WG1 #62, R1-104570, Madrid, Spain, Aug. 23-27, 2010, 10 pages.

(Continued)

*Primary Examiner* — Phirin Sam
(74) *Attorney, Agent, or Firm* — Slater Matsil, LLP

(57) ABSTRACT

A carrier scheduling method and apparatus. The method comprises determining search spaces of downlink control channels corresponding to at least two first transmission time units on a first carrier, where the at least two first transmission time units are scheduled in one second transmission time unit on a second carrier, and the downlink control channels are in a one-to-one correspondence with the first transmission time units; and obtaining, in the search spaces, the downlink control channels corresponding to the at least two first transmission time units. In this application, a plurality of transmission time units on another carrier are scheduled in a cross-carrier manner, thereby improving transmission resource utilization.

20 Claims, 8 Drawing Sheets

---

Determine search spaces of downlink control channels corresponding to at least two first transmission time units on a first carrier — 101

Obtain, in the search spaces, the downlink control channels corresponding to the at least two first transmission time units — 102

(51) Int. Cl.
*H04L 27/26* (2006.01)
*H04W 28/06* (2009.01)
*H04W 72/04* (2009.01)
*H04W 72/12* (2009.01)

(52) U.S. Cl.
CPC ......... *H04L 27/2601* (2013.01); *H04W 28/06* (2013.01); *H04W 72/042* (2013.01); *H04W 72/1205* (2013.01)

(56) References Cited

U.S. PATENT DOCUMENTS

| | | | |
|---|---|---|---|
| 2012/0063349 A1* | 3/2012 | Kim | H04L 27/2647 370/252 |
| 2012/0201230 A1 | 8/2012 | Wang et al. | |
| 2012/0263052 A1 | 10/2012 | Dai et al. | |
| 2013/0215853 A1* | 8/2013 | Li | H04L 5/0094 370/329 |
| 2016/0345299 A1* | 11/2016 | Suzuki | H04W 72/042 |
| 2017/0013565 A1* | 1/2017 | Pelletier | H04W 52/365 |
| 2017/0019864 A1* | 1/2017 | Hwang | H04W 52/0206 |
| 2017/0041904 A1* | 2/2017 | Suzuki | H04L 5/0053 |
| 2018/0242264 A1* | 8/2018 | Pelletier | H04W 52/346 |
| 2019/0028225 A1* | 1/2019 | Yang | H04L 1/1822 |
| 2019/0229825 A1* | 7/2019 | Ahn | H04L 5/001 |

FOREIGN PATENT DOCUMENTS

| | | |
|---|---|---|
| CN | 102045849 A | 5/2011 |
| CN | 102577223 A | 7/2012 |
| CN | 103733560 A | 4/2014 |
| CN | 103891181 A | 6/2014 |
| CN | 104349487 A | 2/2015 |
| EP | 2490495 A1 | 8/2012 |
| WO | 2012041897 A2 | 4/2012 |

OTHER PUBLICATIONS

ZTE, "PDCCH search space for cross-carrier scheduling in LTE-A", 3GPP TSG-RAN WG1 #62, R1-104551, Madrid, Spain, Aug. 23-27, 2010, 10 pages.

Huawei, et al., "Search space design for the cross-CC scheduling", 3GPP TSG RAN WG1 meeting #61bis, R1-103432, Dresden, Germany, Jun. 28-Jul. 2, 2010, 8 pages.

* cited by examiner

Search spaces of subframes of the Scell 2
Subframe 1:
$m' = m + K_{max} \cdot M^{(L)} \cdot (n_{CI} - 1) + M^{(L)}$
Subframe 2:
$m' = m + K_{max} \cdot M^{(L)} \cdot (n_{CI} - 1) + 2 \cdot M^{(L)}$
Subframe 3:
$m' = m + K_{max} \cdot M^{(L)} \cdot (n_{CI} - 1) + 3 \cdot M^{(L)}$
Subframe 4:
$m' = m + K_{max} \cdot M^{(L)} \cdot (n_{CI} - 1) + 4 \cdot M^{(L)}$

CARRIER SCHEDULING METHOD AND APPARATUS

CROSS-REFERENCE TO RELATED APPLICATIONS

This application is a continuation of International Application No. PCT/CN2017/109354, filed on Nov. 3, 2017, which claims priority to Chinese Patent Application No. 201610962707.X, filed on Nov. 4, 2016. The disclosures of the aforementioned applications are hereby incorporated by reference in their entireties.

TECHNICAL FIELD

This application relates to the field of communications technologies, and in particular, to a carrier scheduling method and apparatus.

BACKGROUND

Currently, to meet ever-increasing data transmission rate requirements, the 3rd Generation Partnership Project (3GPP) proposes a carrier aggregation technology. The carrier aggregation technology aggregates a plurality of carriers into a wider spectrum, to increase a system transmission bandwidth, thereby increasing a data transmission rate.

In the carrier aggregation technology, aggregated carriers are usually required to use a same transmission time unit. In a New Radio (NR) access technology, aggregated carriers may use different transmission time units due to service differentiation. In this case, when cross-carrier scheduling is performed, one subframe on one carrier can be used to schedule only one subframe on another carrier. In other words, in one transmission time unit, downlink data transmission and/or uplink data transmission on another carrier can be scheduled only once in a cross-carrier manner. This causes a waste of transmission resources. For example, as shown in FIG. 1, a length of a subframe of a cell 1 is 0.5 millisecond (ms), a length of a subframe of a cell 2 is 0.125 ms, and the length of one subframe of the cell 1 is equal to a length of four subframes of the cell 2. When the cell 1 is configured to schedule the cell 2 in a cross-carrier manner, one subframe of the cell 1 is currently allowed to schedule only one subframe of the cell 2 in a cross-carrier manner. Consequently, three remaining subframes of the cell 2 cannot be scheduled, and this causes a waste of resources in the cell 2.

SUMMARY

This application provides a carrier scheduling method and apparatus, so that a plurality of transmission time units on another carrier are scheduled in a cross-carrier manner, thereby improving transmission resource utilization.

According to a first aspect, this application provides a carrier scheduling method, including:

determining, by user equipment, search spaces of downlink control channels corresponding to at least two first transmission time units on a first carrier; and obtaining, in the search spaces, the downlink control channels corresponding to the at least two first transmission time units, where the at least two first transmission time units are scheduled in one second transmission time unit on a second carrier, and the downlink control channels are in a one-to-one correspondence with the first transmission time units.

In some possible implementations, before determining the search spaces of the downlink control channels corresponding to the at least two first transmission time units on the first carrier, the user equipment may obtain configuration information by receiving the configuration information or by using preset configuration information. In other words, the configuration information may be sent by a base station to the user equipment, or may be determined through pre-negotiation between the user equipment and the base station. Therefore, the user equipment can determine the at least two first transmission time units based on the obtained configuration information.

The at least two first transmission time units may be discrete transmission time units or consecutive transmission time units. The configuration information may include a number of each first transmission time unit, or include a relative location of each first transmission time unit in the at least two first transmission time units, or include a location of a start transmission time unit in the at least two first transmission time units and a total quantity of the first transmission time units, or the like.

In some possible implementations, if the at least two first transmission time units include discrete transmission time units, the configuration information may include a number of each first transmission time unit, or a relative location of each first transmission time unit in the at least two first transmission time units.

In some possible implementations, the configuration information may further include an identifier of the first carrier. Therefore, when determining the search spaces of the downlink control channels corresponding to the at least two first transmission time units on the first carrier, the user equipment may determine the total quantity of the first transmission time units in the at least two first transmission time units based on the configuration information; obtain search space offsets of the downlink control channels corresponding to the at least two first transmission time units based on the total quantity, the identifier of the first carrier, and a quantity of candidate sets of downlink control channels that need to be monitored; and determine, based on the search space offsets, the search spaces of the downlink control channels corresponding to the at least two first transmission time units. The total quantity may be directly obtained from the configuration information, or may be determined based on information about the number or the relative location included in the configuration information.

In some possible implementations, the search spaces of the downlink control channels corresponding to the first transmission time units in the at least two first transmission time units may be different and non-overlapping. Therefore, when obtaining the search space offsets of the downlink control channels corresponding to the first transmission time units based on the total quantity, the identifier of the first carrier, and the quantity of candidate sets of downlink control channels that need to be monitored, the user equipment may obtain the search space offsets of the downlink control channels corresponding to the first transmission time units based on location information of the first transmission time units, the total quantity, the identifier of the first carrier, and the quantity of candidate sets of downlink control channels that need to be monitored. The location information of the first transmission time unit may include a number of the first transmission time unit, a relative location of the first transmission time unit in the at least two first transmission time units, or the like. Therefore, a search space offset of a downlink control channel corresponding to each transmission time unit in the transmission time set may be separately obtained, to determine a search space of the downlink control channel corresponding to each first transmission time unit.

In some possible implementations, the search spaces of the downlink control channels corresponding to the first transmission time units in the at least two first transmission time units may be overlapping, and the total quantity may be a largest quantity of first transmission time units on the first carrier that are scheduled in one second transmission time unit on the second carrier.

In some possible implementations, the downlink control channel may further include control information of the user equipment. Therefore, the user equipment may further decode the downlink control channel to obtain the control information of the user equipment, where the control information may indicate location information of a first transmission time unit corresponding to the control information; determine a number of the first transmission time unit that is on the first carrier and that is aligned with a start symbol of a second transmission time unit to which the control information is corresponding; and determine the first transmission time unit corresponding to the control information based on the number of the aligned first transmission time unit, the location information of the first transmission time unit corresponding to the control information, and a length of the first transmission time unit.

The location information of the first transmission time unit corresponding to the control information may be a number of the first transmission time unit corresponding to the control information, a quantity of transmission time units between the second transmission time unit to which the control information is corresponding and the first transmission time unit corresponding to the control information, a transmission time length between the second transmission time unit to which the control information is corresponding and the first transmission time unit corresponding to the control information, or the like, so that the first transmission time unit corresponding to the control information is determined based on the location information.

In some possible implementations, when determining the first transmission time unit corresponding to the control information based on the number of the aligned first transmission time unit, the location information of the first transmission time unit corresponding to the control information, and the length of the first transmission time unit, the user equipment may determine a time domain offset between the start transmission time unit in the at least two first transmission time units and the aligned first transmission time unit; and determine the first transmission time unit corresponding to the control information based on the time domain offset, the number of the aligned first transmission time unit, the location information of the first transmission time unit corresponding to the control information, and the length of the first transmission time unit. Therefore, a plurality of transmission time units on another carrier are scheduled in a cross-carrier manner, and this improves transmission resource utilization.

According to a second aspect, this application provides a carrier scheduling method, including:

determining, by a base station, downlink control channels corresponding to at least two first transmission time units on a first carrier; and configuring control information in each of search spaces of the downlink control channels corresponding to the at least two first transmission time units, where the at least two first transmission time units are scheduled in one second transmission time unit on a second carrier, and the downlink control channels are in a one-to-one correspondence with the first transmission time units.

In some possible implementations, after configuring the control information in each of the search spaces of the downlink control channels corresponding to the at least two first transmission time units, the base station may further send configuration information to user equipment, so that the user equipment determines the at least two first transmission time units based on the configuration information.

The at least two first transmission time units may be discrete transmission time units or consecutive transmission time units. The configuration information may include a number of each first transmission time unit, or include a relative location of each first transmission time unit in the at least two first transmission time units, or include a location of a start transmission time unit in the at least two first transmission time units and a total quantity of the first transmission time units, or the like.

In some possible implementations, if the at least two first transmission time units include discrete transmission time units, the configuration information may include a number of each first transmission time unit, or a relative location of each first transmission time unit in the at least two first transmission time units.

In some possible implementations, the configuration information may further include an identifier of the first carrier.

In some possible implementations, the search spaces of the downlink control channels corresponding to the first transmission time units in the at least two first transmission time units may be different and non-overlapping. The configuration information may further include location information of each first transmission time unit in the at least two first transmission time units.

In some possible implementations, the search spaces of the downlink control channels corresponding to the first transmission time units in the at least two first transmission time units may be overlapping, and the total quantity may be a largest quantity of first transmission time units on the first carrier that are scheduled in one second transmission time unit on the second carrier.

In some possible implementations, the control information may indicate location information of a first transmission time unit corresponding to the control information. The location information of the first transmission time unit corresponding to the control information may be a number of the first transmission time unit corresponding to the control information, a quantity of transmission time units between the second transmission time unit to which the control information is corresponding and the first transmission time unit corresponding to the control information, a transmission time length between the second transmission time unit to which the control information is corresponding and the first transmission time unit corresponding to the control information, or the like, so that the first transmission time unit corresponding to the control information is determined based on the location information. Therefore, a plurality of transmission time units on another carrier are scheduled in a cross-carrier manner, and this improves transmission resource utilization.

According to a third aspect, this application further provides a carrier scheduling apparatus, where the carrier scheduling apparatus includes an obtaining module and a determining module, and the carrier scheduling apparatus implements some or all steps of the carrier scheduling method in the first aspect by using the foregoing modules.

According to a fourth aspect, this application further provides a carrier scheduling apparatus, where the carrier scheduling apparatus includes a determining module and a configuration module, and the carrier scheduling apparatus implements some or all steps of the carrier scheduling method in the second aspect by using the foregoing modules.

According to a fifth aspect, this application further provides a computer storage medium, where the computer storage medium stores a program, and when being executed, the program includes some or all steps of the carrier scheduling method in the first aspect.

According to a sixth aspect, this application further provides a computer storage medium, where the computer storage medium stores a program, and when being executed, the program includes some or all steps of the carrier scheduling method in the second aspect.

According to a seventh aspect, this application further provides user equipment, including a communications interface, a memory, and a processor, where the processor is separately connected to the communications interface and the memory, and the processor is configured to perform some or all steps of the carrier scheduling method in the first aspect.

According to an eighth aspect, this application further provides a base station, including a communications interface, a memory, and a processor, where the processor is separately connected to the communications interface and the memory, and the processor is configured to perform some or all steps of the carrier scheduling method in the second aspect.

According to a ninth aspect, this application further provides a carrier scheduling system, including user equipment and a base station, where the user equipment is configured to perform some or all steps of the carrier scheduling method in the first aspect, and the base station is configured to perform some or all steps of the carrier scheduling method in the second aspect.

In the technical solutions provided in this application, when cross-carrier scheduling is configured for the user equipment during which at least two transmission time units on the first carrier are scheduled by using a transmission time unit on the second carrier, the search spaces of the downlink control channels corresponding to the at least two transmission time units are determined, and the downlink control channels corresponding to the at least two transmission time units are determined from the search spaces, so that a plurality of transmission time units on another carrier are scheduled in a cross-carrier manner. This improves transmission resource utilization.

DESCRIPTION OF EMBODIMENTS

Figure 1:
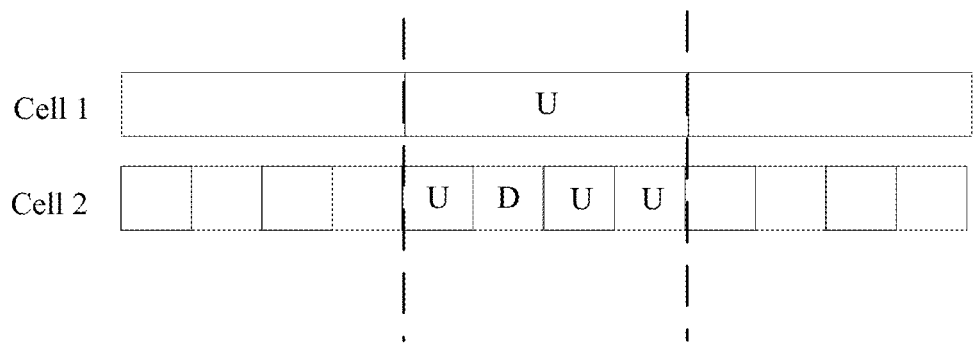
FIG. 1 is a schematic structural diagram of a subframe according to an embodiment of the present application.

The following describes the technical solutions in this application with reference to the accompanying drawings in the embodiments of the present application. Apparently, the described embodiments are merely some instead of all of the embodiments of this application. All other embodiments obtained by a person of ordinary skill in the art based on the embodiments of this application without creative efforts shall fall within the protection scope of the present application.

The terms "first", "second", and the like in this application are intended to distinguish between different objects but are not intended to describe a specific order. In addition, the terms "including" or any other variant thereof, are intended to cover non-exclusive inclusion. For example, a process, a method, a system, a product, or a device that includes a series of steps or modules is not limited to the listed steps or modules, but optionally further includes an unlisted step or module, or optionally further includes another inherent step or module of the process, the method, the product, or the device.

It should be understood that the technical solutions of this application may be applied to various communications systems such as a Code Division Multiple Access (CDMA) system, a Wideband Code Division Multiple Access (WCDMA) system, a Time Division-Synchronous Code Division Multiple Access (TD-SCDMA) system, a Universal Mobile Telecommunication System (UMTS), or a Long Term Evolution (LTE) system. With development of communications technologies, the technical solutions of this application may also be applied to a future network, for example, the 5th generation mobile communications technology (5G) network. This is not limited in the embodiments of the present application.

In this application, user equipment (UE) may also be referred to as a terminal, a mobile station (MS), a mobile terminal, or the like. The user equipment may communicate with one or more core networks by using a radio access network (such as RAN, radio access network). The user equipment may be a mobile terminal such as a mobile phone (or referred to as a "cellular" phone) and a computer with a mobile terminal, or may be a portable, pocket-sized, handheld, computer built-in, or in-vehicle mobile apparatus, which exchanges voice and/or data with the radio access network, or the like. In the embodiments of the present application, a base station may be a base station in GSM or CDMA, for example, a base transceiver station (BTS), or may be a base station in WCDMA, for example, a NodeB, or may be an evolved NodeB in the LTE, for example, an eNB or an e-NodeB (evolved NodeB), or may be a base station in a further network. This is not limited in the embodiments of the present application.

In this application, a transmission time unit is a time unit for data transmission. For example, the transmission time unit may be a subframe, a slot, a radio frame, a mini slot, a plurality of aggregated slots, a plurality of aggregated subframes, or the like, or may be a transmission time interval (TTI). This is not limited in this application. One transmission time interval is equal to a total length of several subframes, or a sum of several transmission time intervals is equal to a length of one subframe. The subframe is used as an example, subframe spacing used by a carrier may be 15 kHz×2^n (where 2^n is 2 raised to the power of n), and a corresponding length of the subframe is 1/(2^n) ms. In other words, a plurality of transmission time units such as 0.5 ms, 0.25 ms, and 0.125 ms are supported, where n is an integer.

Figure 2:
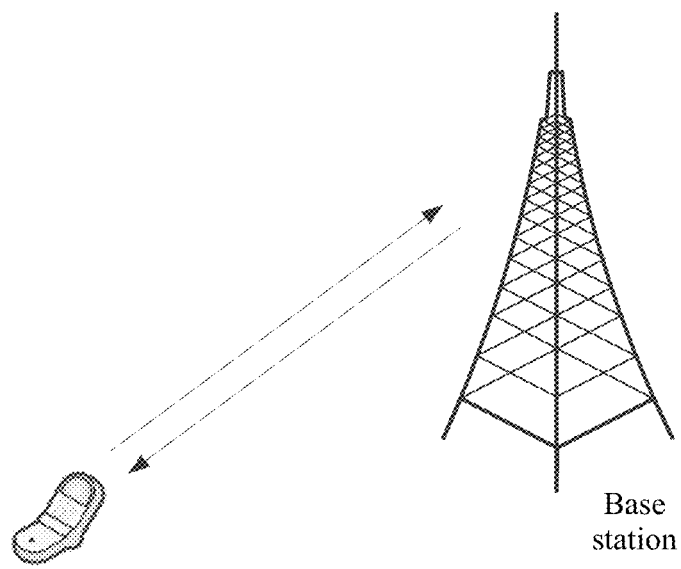
FIG. 2 is a diagram of a carrier scheduling system architecture according to an embodiment of the present application.
Figure 3:
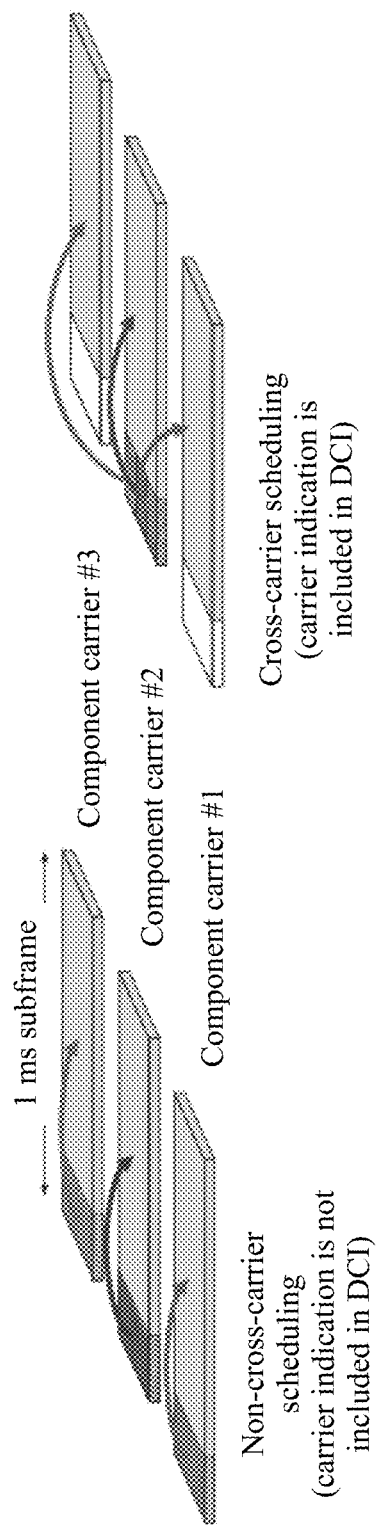
FIG. 3 is a schematic diagram of a carrier scheduling scenario according to an embodiment of the present application.

The following describes a system architecture of this application. FIG. 2 is a diagram of a carrier scheduling system architecture according to an embodiment of the present application. As shown in FIG. 2, data may be transmitted between a base station and user equipment based on the foregoing transmission time unit. During data transmission, a carrier aggregation technology may be used to improve data transmission efficiency. During carrier aggregation, cross-carrier scheduling or non-cross-carrier scheduling may be configured for the user equipment, namely, the UE. Specifically, as shown in FIG. 3, the non-cross-carrier scheduling means that information carried by a physical downlink control channel (PDCCH) sent in each cell is corresponding to downlink resource allocation or uplink resource allocation of the cell. In other words, a radio resource in the current cell is scheduled. The cross-carrier scheduling means that a PDCCH in a cell schedules a radio resource in another cell. In other words, the PDCCH is transmitted in a cell, but a corresponding physical downlink shared channel (PDSCH) or a physical uplink shared channel (PUSCH) is transmitted in another cell. When data is transmitted on a carrier, the UE may receive a corresponding PDCCH only on one carrier (the foregoing carrier, or another carrier in the cross-carrier scheduling). If cross-carrier scheduling is configured for the UE, the base station may notify the UE of a carrier to receive the PDCCH (specifically, may notify the UE of a number of the carrier).

During data transmission between the base station and the UE, the UE needs to monitor and decode a set of all PDCCH candidates in one transmission time unit, for example, in one subframe, and the candidate set includes one or more PDCCHs that need to be monitored. In this embodiment of the present application, a location of a PDCCH is determined by configuring a search space offset for each PDCCH or configuring a search space offset for all PDCCHs in one transmission time unit, and then notifying a timing relationship between the PDCCH and the PDSCH, to obtain control information of a plurality of transmission time units in the cross-carrier scheduling, so that the UE can transmit data in the plurality of transmission time units based on the control information. Therefore, one transmission time unit on one carrier is used to schedule a plurality of transmission time units on another carrier. In other words, a plurality of transmission time units are scheduled in a cross-carrier manner. The data transmission includes downlink data transmission and/or uplink data transmission.

This application discloses a carrier scheduling method, apparatus, and system, user equipment, and a base station, so that a plurality of transmission time units on another carrier are scheduled in a cross-carrier manner, thereby improving transmission resource utilization. Details are separately described as follows.

Figure 4:
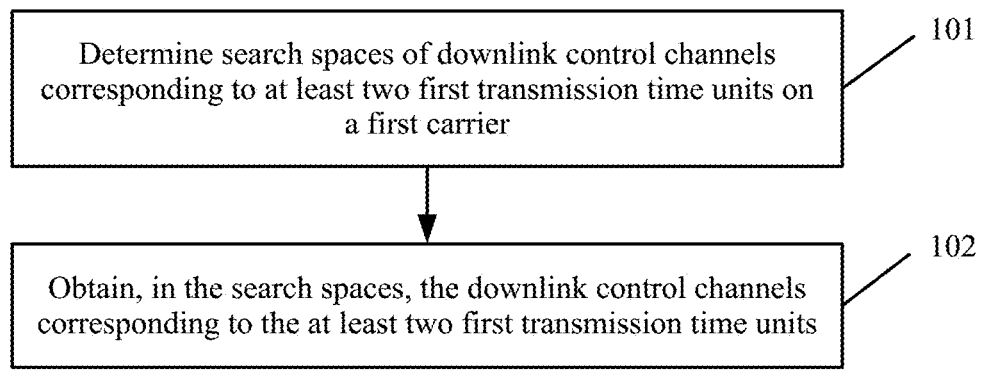
FIG. 4 is a schematic flowchart of a carrier scheduling method according to an embodiment of the present application.

FIG. 4 is a schematic flowchart of a carrier scheduling method according to an embodiment of the present application. Specifically, the method in this embodiment of the present application may be applied to the foregoing user equipment. As shown in FIG. 4, the carrier scheduling method in this embodiment of the present application includes the following steps.

101. Determine search spaces of downlink control channels corresponding to at least two first transmission time units on a first carrier.

The at least two first transmission time units are scheduled in one second transmission time unit on a second carrier, and the downlink control channels are in a one-to-one correspondence with the first transmission time units. The first transmission time unit is a transmission time unit on the first carrier, and the second transmission time unit is a transmission time unit on the second carrier.

Optionally, the UE may determine a transmission time set that is to be scheduled, and the transmission time set indicates first transmission time units on the first carrier that are scheduled in one second transmission time unit on the second carrier. The transmission time set includes at least two first transmission time units. A length of the transmission time set may be determined based on a quantity of the first transmission time units in the set and a length of each first transmission time unit.

In this embodiment of the present application, a length of the transmission time unit on the first carrier may be the same as or different from a length of the transmission time unit on the second carrier. In other words, a length of the first transmission time unit may be equal to or less than or greater than a length of the second transmission time unit. This is not limited in this embodiment of the present application.

Optionally, the at least two first transmission time units (in other words, the transmission time units in the transmission time set) may include discrete transmission time units, or may be consecutive transmission time units. Before determining the search spaces of the downlink control channels corresponding to the at least two first transmission time units on the first carrier, the UE may obtain configuration information, and determine the at least two first transmission time units based on the configuration information. The configuration information may include a number of each first transmission time unit, or include a relative location of each first transmission time unit in the at least two first transmission time units, for example, a bitmap, or include a location of a start transmission time unit in the at least two first transmission time units and a total quantity of the first transmission time units, or the like.

Optionally, the at least two first transmission time units may include discrete transmission time units. Before determining the search spaces of the downlink control channels corresponding to the at least two first transmission time units on the first carrier, the UE may further obtain configuration information, and determine the at least two first transmission time units based on the configuration information. The configuration information may include a number of each first transmission time unit, or a relative location of each first transmission time unit in the at least two first transmission time units, for example, a bitmap. In other words, if the transmission time units in the transmission time set include discrete transmission time units, the transmission time set may be determined based on an number of each transmission time unit in the transmission time set, or a relative location of each transmission time unit in the transmission time set.

Further, optionally, the configuration information may be sent by a base station to the UE, for example, when cross-carrier scheduling is configured for the UE, the configuration information is sent by the base station to the UE, and the UE receives the configuration information sent by the base station; or the configuration information may be determined through pre-negotiation between the UE and the base station. This is not limited in this embodiment of the present application.

Optionally, the configuration information may further include an identifier of the first carrier. The determining search spaces of downlink control channels corresponding to at least two first transmission time units on a first carrier may be specifically: determining the total quantity of the first transmission time units in the at least two first transmission time units based on the configuration information; obtaining search space offsets of the downlink control channels corresponding to the at least two first transmission time units based on the total quantity, the identifier of the first carrier, and a quantity of candidate sets of downlink control channels that need to be monitored; and determining, based on the search space offsets, the search spaces of the downlink control channels corresponding to the at least two first transmission time units. The total quantity may be directly obtained from the configuration information, or may be determined based on information about the number or the relative location included in the configuration information. Further, the search spaces of the downlink control channels corresponding to the at least two first transmission time units may be overlapping, or may be independent of each other.

Specifically, the UE may monitor a set of PDCCH candidates in a subframe. In other words, the UE needs to try decoding each PDCCH in the set based on a format of monitored downlink control information (DCI). The set is referred to as a search space of the UE, and may be recorded as $S_k^{(L)}$. A control channel element (CCE) occupied by a PDCCH candidate m in the search space $S_k^{(L)}$ may be calculated according to the following formula:

$$L\{(Y_k+m') \bmod \lfloor N_{CCE,k}/L \rfloor\}+i$$

L is an aggregation level (Aggregation level), and a value of L may be 1, 2, 4, 8, or the like. $N_{CCE,k}$ is a quantity (Size) of CCEs of a control region included in a transmission time unit k, for example, a subframe k, where i=1 and m=0, ..., $M^{(L)}-1$. $M^{(L)}$ is a quantity of PDCCH candidates that need to be monitored in a given search space, in other words, a quantity of candidate sets of PDCCHs that need to be monitored. For example, a correspondence between L, $N_{CCE,k}$, and $M^{(L)}$ may be shown in the following Table 1.

TABLE 1

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |

TABLE 1-continued

| Type | Search space $S_k^{(L)}$ | | Number of PDCCH candidates $M^{(L)}$ |
|---|---|---|---|
| | Aggregation level L | Size [in CCEs] | |
| | 4 | 8 | 2 |
| | 8 | 16 | 2 |
| Common | 4 | 16 | 4 |
| | 8 | 16 | 2 |

Specifically, the search space may be classified into a common search space (Common) and a UE-specific search space (UE-specific, a search space for specific UE). For the common search space, m'=m, and $Y_k$ is 0. For the UE-specific search space, $Y_k$ is defined as $Y_k=(A \cdot Y_{k-1}) \bmod D$, where $Y_{-1}=n_{RNTI} \neq 0$, A=39827, D=65537, $k \leq \lfloor n_s/2 \rfloor$, and $n_s$ is a slot (slot) number (a value range may be 0-19) in a radio frame. When cross-carrier scheduling is not configured for the UE, m'=m. When cross-carrier scheduling is configured for the UE, m'=m+search space offset, and the search space offset may be obtained through calculation in this embodiment of the present application. Further, a start location of the common search space may be a CCE 0, and a start location of the UE-specific search space may be obtained through calculation according to the foregoing formula (when i=0). In this embodiment of the present application, when cross-carrier scheduling is configured for the UE, by calculating the search space offsets of the downlink control channels corresponding to the at least two first transmission time units, in other words, by calculating a search space offset of a PDCCH corresponding to each transmission time unit in the transmission time set, a CCE occupied by the PDCCH may be determined, so as to determine a search space corresponding to the PDCCH.

102. Obtain, in the search spaces, the downlink control channels corresponding to the at least two first transmission time units.

Further, optionally, in some embodiments, the search spaces of the downlink control channels corresponding to the first transmission time units in the at least two first transmission time units may be different and non-overlapping. In other words, a search space of a downlink control channel corresponding to each transmission time unit in the transmission time set may be independently configured. The obtaining search space offsets of the downlink control channels corresponding to the first transmission time units based on the total quantity, the identifier of the first carrier, and a quantity of candidate sets of downlink control channels that need to be monitored may be specifically: obtaining the search space offsets of the downlink control channels corresponding to the first transmission time units based on location information of the first transmission time units, the total quantity, the identifier of the first carrier, and the quantity of candidate sets of downlink control channels that need to be monitored. The location information of the first transmission time unit may include a number of the first transmission time unit, a relative location of the first transmission time unit in the at least two first transmission time units, or the like. Therefore, a search space offset of a downlink control channel corresponding to each transmission time unit in the transmission time set may be separately obtained, to determine the search space of the downlink control channel corresponding to each first transmission time unit.

Specifically, it is assumed that both the first transmission time unit and the second transmission time unit are subframes, the second carrier is an Scell 1, the first carrier is an Scell 2, and a maximum of $K_{max}$ subframes (first transmission time units) of the Scell 2 may be scheduled in one subframe (one second transmission time unit) of the Scell 1. As a result, a quantity of subframes of the Scell 2 that are included in the transmission time set may be greater than or equal to 2, and less than or equal to $K_{max}$. In the transmission time set, search spaces of different subframes of the Scell 2 in a control region of the Scell 1 are different and non-overlapping. Optionally, when cross-carrier scheduling is configured for the UE, the UE may calculate a search space corresponding to each first transmission time unit based on a search space offset corresponding to each first transmission time unit and m.

$$m'=m+K_{max}\cdot M^{(L)}\cdot (n_{C1}-1)+f(\text{index})\cdot M^{(L)}$$

Figure 6:
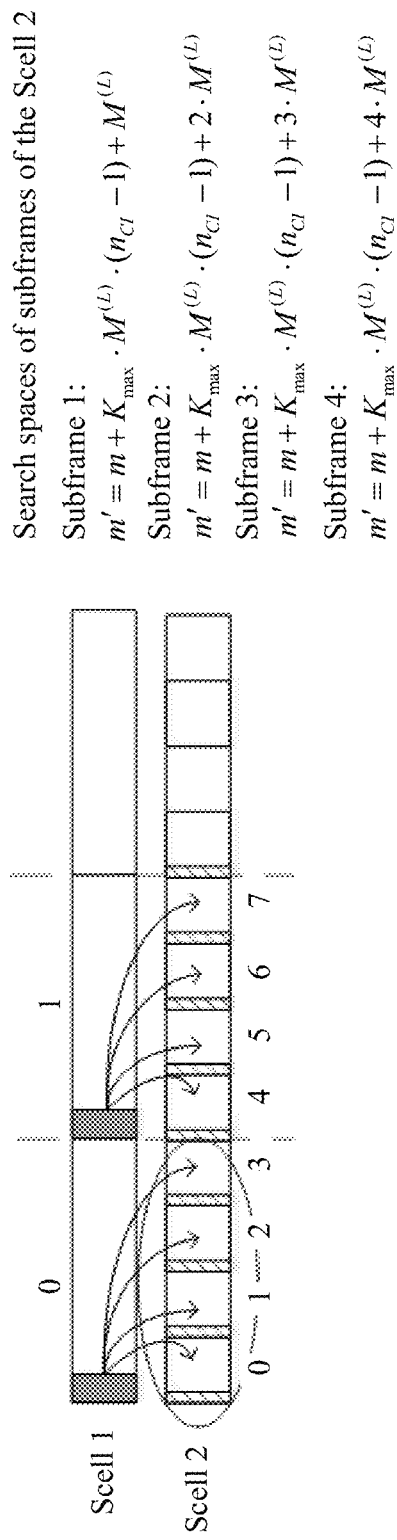
FIG. 6 is a schematic diagram of a correspondence between a search space and a transmission time unit according to an embodiment of the present application.

In this formula, m=0, ..., $M^{(L)}-1$, $M^{(L)}$ is a quantity of PDCCH candidate sets that need to be monitored, $n_{C1}$ is a number of a cross-carrier scheduled carrier, to be specific, a number of the Scell 2 (the first carrier), "index" indicates location information of the first transmission time unit, which may specifically include a number of a subframe of the Scell 2, or a relative location of a subframe of the Scell 2 in the transmission time set, and f(index) is a function of index. For example, when "index" is the relative location of the subframe of the Scell 2 in the transmission time set, f(index)=index, and a value of "index" ranges from 1 to a total quantity of the first transmission time units included in the transmission time set. It is assumed that the transmission time set (a subframe region within an ellipse in FIG. 6) includes four consecutive subframes, and a correspondence between a search space and a subframe for the four subframes may be shown in FIG. 6.

Further, optionally, in some embodiments, the search spaces of the downlink control channels corresponding to the first transmission time units in the at least two first transmission time units may be overlapping. In other words, the downlink control channels corresponding to the transmission time units in the transmission time set may share one search space. Further, the total quantity of the first transmission time units in the at least two first transmission time units (in other words, the total quantity of the transmission time units in the transmission time set) may be a largest quantity of first transmission time units on the first carrier that are scheduled in one second transmission time unit on the second carrier.

Specifically, still in the foregoing example, the transmission time unit is a subframe, the first carrier is the Scell 2, the second carrier is the Scell 1, and a maximum of $K_{max}$ subframes of the Scell 2 may be scheduled in one subframe of the Scell 1. When cross-carrier scheduling is configured for the UE, and all the transmission time units in the transmission time set share one search space, the UE may calculate a search space corresponding to each first transmission time unit based on a search space offset of each transmission time unit in the transmission time set and m.

$$m'=m+K_{max}\cdot M^{(L)}\cdot n_{C1}$$

Figure 7:
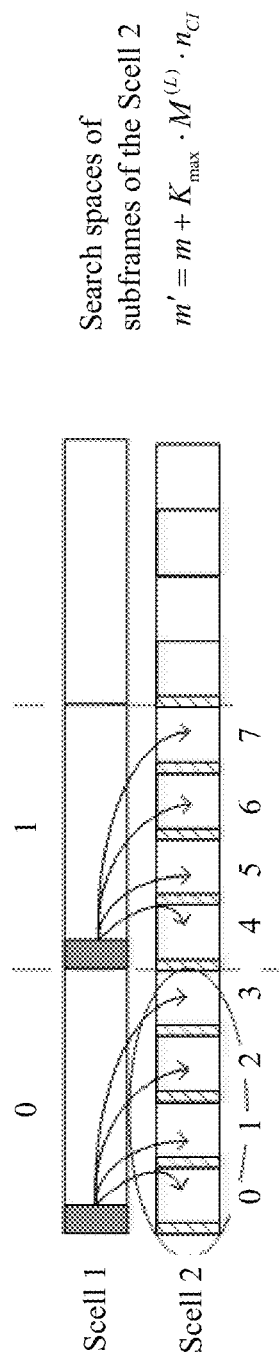
FIG. 7 is a schematic diagram of another correspondence between a search space and a transmission time unit according to an embodiment of the present application.

In this formula, m=0, ..., $M^{(L)}-1$, $M^{(L)}$ is a quantity of PDCCH candidate sets that need to be monitored, $K_{max}$ may be a largest quantity of subframes of the Scell 2 that can be scheduled in one subframe of the Scell 1, and $n_{C1}$ is an number of the Scell 2. Likewise, it is assumed that the transmission time set includes four consecutive subframes, and a correspondence between a search space and a subframe for the four subframes may be shown in FIG. 7.

Optionally, the downlink control channel, namely, the PDCCH, may include control information of the UE. The UE may further decode the PDCCH to obtain the control information of the UE. The control information indicates location information of a first transmission time unit corresponding to the control information, to be specific, indicates a timing relationship between a second transmission time unit to which the control information is corresponding and a first transmission time unit corresponding to the control information. Further, the UE may determine a number of the first transmission time unit that is on the first carrier and that is aligned with a start symbol of the second transmission time unit to which the control information is corresponding; and determine the first transmission time unit corresponding to the control information based on the number of the aligned first transmission time unit, the location information of the first transmission time unit corresponding to the control information, and a length of the first transmission time unit. The location information of the first transmission time unit corresponding to the control information may be a number of the first transmission time unit corresponding to the control information, a quantity of transmission time units between the second transmission time unit to which the control information is corresponding and the first transmission time unit corresponding to the control information, a transmission time length between the second transmission time unit to which the control information is corresponding and the first transmission time unit corresponding to the control information, or the like, so that the first transmission time unit corresponding to the control information is determined based on the location information.

Further, optionally, a time domain offset may exist between the transmission time set and the aligned first transmission time unit. To be specific, a time domain offset may exist between the start transmission time unit in the at least two first transmission time units and the aligned first transmission time unit. The determining the first transmission time unit corresponding to the control information based on the number of the aligned first transmission time unit, the location information of the first transmission time unit corresponding to the control information, and a length of the first transmission time unit may be specifically: determining a time domain offset between the start transmission time unit in the at least two first transmission time units and the aligned first transmission time unit; and determining the first transmission time unit corresponding to the control information based on the time domain offset, the number of the aligned first transmission time unit, the location information of the first transmission time unit corresponding to the control information, and the length of the first transmission time unit.

Figure 5A:
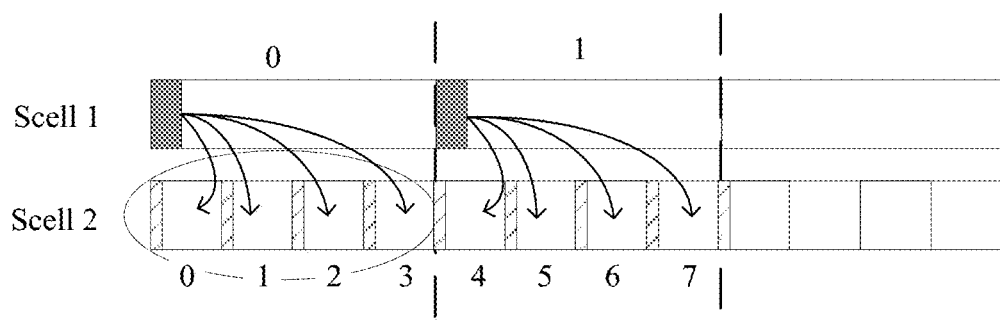
FIG. 5a is a schematic diagram of cross-carrier scheduling in transmission time units according to an embodiment of the present application.
Figure 5B:
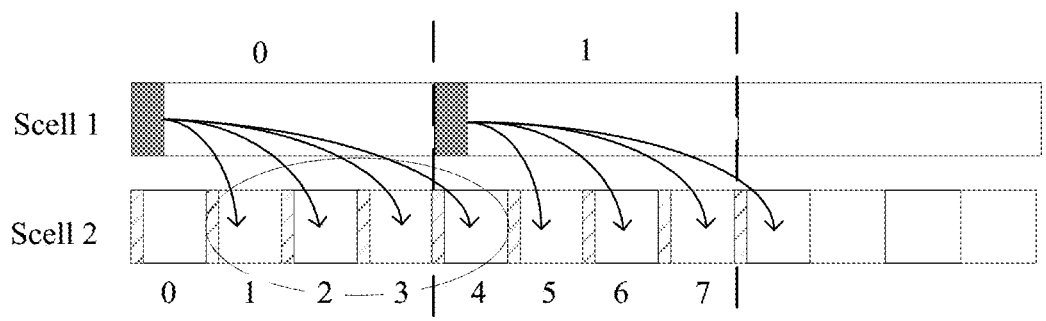
FIG. 5b is another schematic diagram of cross-carrier scheduling in transmission time units according to an embodiment of the present application.

In a specific embodiment, control information of the PDCCH, for example, DCI, may indicate a timing relationship between the control information and a transmission time unit for data transmission, to be specific, indicate a timing relationship between a scheduling grant and data transmission. For example, when the base station sends a scheduling grant (including a DL grant or a UL grant) in a subframe n, and transmits data in a subframe n+k, control information may indicate a value of k, a number of a subframe on a first carrier corresponding to n, a transmission time length between the subframe n and the subframe n+k, or the like, where k is greater than or equal to 0. When detecting the control information for the Scell 2 in a subframe n of the Scell 1, the UE may determine a subframe that is on the Scell 2 and that is aligned with a first symbol of the subframe n of the Scell 1. If the determined subframe is m, it may be determined that the data is transmitted in an (m+k)$^{th}$ subframe of the Scell 2. For example, as shown in FIG. 5a, it is assumed that a subframe to which control information is corresponding is a subframe whose number is 0 on the Scell 1, namely, a subframe 0 of the Scell 1, and a subframe that is on the Scell 2 and that is aligned with the subframe 0 of the Scell 1 is a subframe 0 of the Scell 2. When the control information indicates that location information of a first transmission time unit corresponding to the control information is 0+2, it may be determined that a subframe for data transmission is a subframe 2 of the Scell 2. When the control information indicates that location information of a first transmission time unit corresponding to the control information is a subframe 2 or a subframe 2 of the Scell 2, it may be determined that a subframe for data transmission is a subframe to which the subframe 2 of the Scell 2 belongs. When the control information indicates that location information of a first transmission time unit corresponding to the control information is a length between two subframes of the Scell 2, it may be determined that a subframe for data transmission is a subframe 2 of the Scell 2. For another example, as shown in FIG. 5b, it is still assumed that a subframe to which control information is corresponding is a subframe whose number is 0 on the Scell 1, namely, a subframe 0 of the Scell 1, and a subframe that is on the Scell 2 and that is aligned with the subframe 0 of the Scell 1 is a subframe 0 of the Scell 2. The UE may determine that a time domain offset between a start transmission time unit (a subframe 1 of the Scell 2) in the transmission time set (including the subframe 1, a subframe 2, a subframe 3, and a subframe 4 of the Scell 2) and the subframe 0 of the Scell 2 is +1, in other words, a time domain offset between the start transmission time unit and the subframe 0 of the Scell 1 is +1, and may determine a timing relationship between a scheduling grant and data transmission is 0+2. As a result, the UE may determine that the subframe for data transmission is a subframe 3 of the Scell 2.

It should be noted that the quantity of interval transmission time units, and the interval transmission time length are counted based on the length of the transmission time unit on the first carrier, namely, the first transmission time unit. In other words, the location information of the first transmission time unit corresponding to the control information is determined based on the length of the first transmission time unit.

Figure 8:
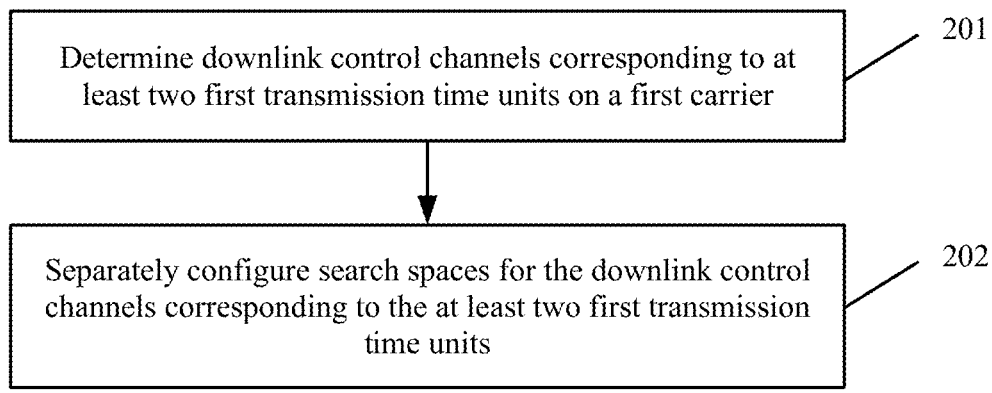
FIG. 8 is a schematic flowchart of another carrier scheduling method according to an embodiment of the present application.

FIG. 8 is a schematic flowchart of another carrier scheduling method according to an embodiment of the present application. Specifically, the method in this embodiment of the present application may be applied to the foregoing base station. As shown in FIG. 8, the carrier scheduling method in this embodiment of the present application includes the following steps.

201. Determine downlink control channels corresponding to at least two first transmission time units on a first carrier.

The at least two first transmission time units are scheduled in one second transmission time unit on a second carrier, and the downlink control channels are in a one-to-one correspondence with the first transmission time units.

In this embodiment of the present application, a length of the first transmission time unit may be the same as or different from a length of the second transmission time unit. In other words, the length of the first transmission time unit may be equal to or less than or greater than the length of the second transmission time unit. This is not limited in this embodiment of the present application.

202. Configure control information in each of search spaces of the downlink control channels corresponding to the at least two first transmission time units.

In a specific embodiment, when cross-carrier scheduling needs to be configured for UE, the base station may determine the scheduled at least two first transmission time units, further determine PDCCHs corresponding to the at least two first transmission time units, and may further configure the control information on the PDCCHs corresponding to the at least two first transmission time units, where the control information may be specifically configured in a search space of each PDCCH, so that the UE determines the PDCCHs from the search spaces, determines the transmission time units indicated by the PDCCHs, and transmits data based on the transmission time units.

Optionally, the base station may determine a transmission time set that is to be scheduled, and the transmission time set indicates first transmission time units on the first carrier that are scheduled in one second transmission time unit on the second carrier. The transmission time set includes at least two first transmission time units.

Optionally, the at least two first transmission time units (in other words, the transmission time units in the transmission time set) may include discrete transmission time units, or may be consecutive transmission time units. After configuring the control information in the search spaces of the downlink control channels corresponding to the at least two first transmission time units, the base station may send configuration information to the UE, so that the UE determines the at least two first transmission time units based on the configuration information. The configuration information may include a number of each first transmission time unit, or include a relative location of each first transmission time unit in the at least two first transmission time units, or include a location of a start transmission time unit in the at least two first transmission time units, a length of the first transmission time unit, and a total quantity of the first transmission time units, or the like.

Optionally, the at least two first transmission time units may include discrete transmission time units. After configuring the control information in the search spaces of the downlink control channels corresponding to the at least two first transmission time units, the base station may send configuration information to the UE, so that the UE determines the at least two first transmission time units based on the configuration information. The configuration information may include a number of each first transmission time unit, a relative location of each first transmission time unit in the at least two first transmission time units, or the like.

Further, optionally, the configuration information may further include an identifier of the first carrier, so that the UE determines a search space offset of a downlink control channel corresponding to each first transmission time unit based on the configuration information, for example, an identifier of the first carrier, such as a number of the first carrier, and further determines, based on the search space offset, a search space of the downlink control channel corresponding to each first transmission time unit.

Optionally, the search spaces of the downlink control channels corresponding to the first transmission time units in the at least two first transmission time units may be different and non-overlapping. In other words, a search space of a downlink control channel corresponding to each transmission time unit in the transmission time set may be independently configured. Therefore, the configuration information may further include location information of each first transmission time unit in the at least two first transmission time units, for example, a number of each first transmission time unit in the at least two first transmission time units, a relative location of each first transmission time unit in the at least two first transmission time units, or the like.

Optionally, the search spaces of the downlink control channels corresponding to the first transmission time units in the at least two first transmission time units may be overlapping. In other words, the downlink control channels corresponding to the transmission time units in the transmission time set may share one search space. Further, the total quantity of the first transmission time units in the at least two first transmission time units (in other words, the total quantity of the transmission time units in the transmission time set) may be a largest quantity of first transmission time units on the first carrier that are scheduled in one second transmission time unit on the second carrier.

Further, optionally, the downlink control channel may include control information of the UE, and the control information may indicate location information of a first transmission time unit corresponding to the control information, to be specific, indicate a timing relationship between a second transmission time unit to which the control information is corresponding and a first transmission time unit corresponding to the control information. The location information of the first transmission time unit corresponding to the control information may be a number of the first transmission time unit corresponding to the control information, a quantity of transmission time units between the second transmission time unit to which the control information is corresponding and the first transmission time unit corresponding to the control information, a transmission time length between the second transmission time unit to which the control information is corresponding and the first transmission time unit corresponding to the control information, or the like, so that the UE determines, based on the location information, the first transmission time unit corresponding to the control information.

In this embodiment of the present application, when cross-carrier scheduling is configured for user equipment during which at least two transmission time units on the first carrier are scheduled by using a transmission time unit on the second carrier, the search spaces of the downlink control channels corresponding to the at least two transmission time units are determined, and the downlink control channels corresponding to the at least two transmission time units are determined from the search spaces, so that a plurality of transmission time units on another carrier are scheduled in a cross-carrier manner. This improves transmission resource utilization.

Figure 9:
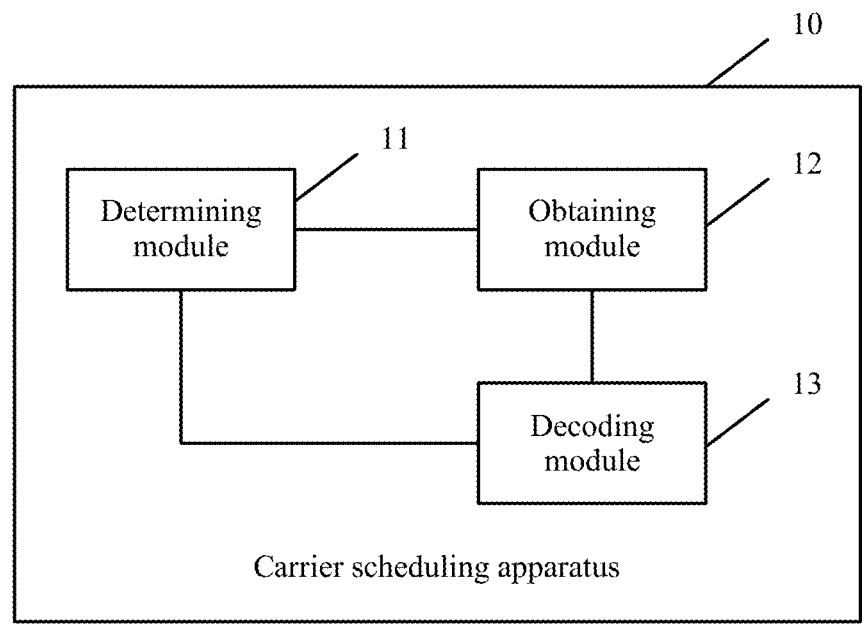
FIG. 9 is a schematic structural diagram of a carrier scheduling apparatus according to an embodiment of the present application.

FIG. 9 is a schematic structural diagram of a carrier scheduling apparatus according to an embodiment of the present application. Specifically, the carrier scheduling apparatus 10 in this embodiment of the present application may be specifically disposed in the foregoing user equipment. As shown in FIG. 9, the carrier scheduling apparatus 10 in this embodiment of the present application may include a determining module 11 and an obtaining module 12.

The determining module 11 is configured to determine search spaces of downlink control channels corresponding to at least two first transmission time units on a first carrier.

The at least two first transmission time units are scheduled in one second transmission time unit on a second carrier, and the downlink control channels are in a one-to-one correspondence with the first transmission time units. The first transmission time unit is a transmission time unit on the first carrier, and the second transmission time unit is a transmission time unit on the second carrier. A length of the transmission time unit on the first carrier may be the same as or different from a length of the transmission time unit on the second carrier. In other words, a length of the first transmission time unit may be equal to or less than or greater than a length of the second transmission time unit. This is not limited in this embodiment of the present application.

The obtaining module 12 is configured to obtain, in the search spaces, the downlink control channels corresponding to the at least two first transmission time units.

Optionally, in this embodiment of the present application, the at least two first transmission time units may be discrete transmission time units or consecutive transmission time units.

The obtaining module 12 may further be configured to obtain configuration information.

The determining module 11 may further be configured to determine the at least two first transmission time units based on the configuration information.

The configuration information may include a number of each first transmission time unit, or include a relative location of each first transmission time unit in the at least two first transmission time units, or include a location of a start transmission time unit in the at least two first transmission time units, a length of the first transmission time unit, and a total quantity of the first transmission time units, or the like.

Optionally, in some embodiments, the at least two first transmission time units may be discrete transmission time units. Therefore, the configuration information may include a number of each first transmission time unit, or a relative location of each first transmission time unit in the at least two first transmission time units, so that the determining module 11 can determine the at least two first transmission time units based on the configuration information.

Optionally, the configuration information may be sent by a base station to the user equipment, and the user equipment may receive the configuration information sent by the base station; or the configuration information may be determined through pre-negotiation between the user equipment and the base station.

Further, the configuration information may further include an identifier of the first carrier, and the determining module 11 may be specifically configured to:

determine the total quantity of the first transmission time units in the at least two first transmission time units based on the configuration information;

obtain search space offsets of the downlink control channels corresponding to the at least two first transmission time units based on the total quantity, the identifier of the first carrier, and a quantity of candidate sets of downlink control channels that need to be monitored; and determine, based on the search space offsets, the search spaces of the downlink control channels corresponding to the at least two first transmission time units.

The total quantity may be directly obtained from the configuration information, or may be determined based on information about the number or the relative location included in the configuration information. Further, the search spaces of the downlink control channels corresponding to the at least two first transmission time units may be overlapping, or may be independent of each other.

Optionally, the search spaces of the downlink control channels corresponding to the first transmission time units in the at least two first transmission time units may be different and non-overlapping. In other words, a search space of a downlink control channel corresponding to each transmission time unit may be independently configured. Therefore, when obtaining the search space offsets of the downlink control channels corresponding to the first transmission time units based on the total quantity, the identifier of the first carrier, and the quantity of candidate sets of downlink control channels that need to be monitored, the determining module 11 may be specifically configured to:

obtain the search space offsets of the downlink control channels corresponding to the first transmission time units based on location information of the first transmission time units, the total quantity, the identifier of the first carrier, and the quantity of candidate sets of downlink control channels that need to be monitored.

The location information of the first transmission time unit may include a number of the first transmission time unit, or a relative location of the first transmission time unit in the at least two first transmission time units, for example, a bitmap. Therefore, the determining module 11 may obtain a search space offset of the downlink control channel corresponding to each transmission time unit in the at least two first transmission time units, to further determine the search space of the downlink control channel corresponding to each first transmission time unit.

Optionally, the search spaces of the downlink control channels corresponding to the first transmission time units in the at least two first transmission time units may be overlapping. In other words, the downlink control channels corresponding to the transmission time units may share one search space. Further, the total quantity of the first transmission time units in the at least two first transmission time units may be a largest quantity of first transmission time units on the first carrier that are scheduled in one second transmission time unit on the second carrier.

Further, the downlink control channel may include control information of the user equipment, and the apparatus 10 may further include:

a decoding module 13, configured to decode the downlink control channel to obtain the control information of the user equipment, where the control information indicates location information of a first transmission time unit corresponding to the control information.

The determining module 11 is further configured to: determine a number of the first transmission time unit that is on the first carrier and that is aligned with a start symbol of a second transmission time unit to which the control information is corresponding; and determine the first transmission time unit corresponding to the control information based on the number of the aligned first transmission time unit, the location information of the first transmission time unit corresponding to the control information, and a length of the first transmission time unit.

The location information of the first transmission time unit corresponding to the control information may be a number of the first transmission time unit corresponding to the control information, a quantity of transmission time units between the second transmission time unit to which the control information is corresponding and the first transmission time unit corresponding to the control information, a transmission time length between the second transmission time unit to which the control information is corresponding and the first transmission time unit corresponding to the control information, or the like, so that the determining module 11 determines, based on the location information, the first transmission time unit corresponding to the control information.

Further, optionally, a time domain offset may exist between the at least two first transmission time units and the aligned first transmission time unit. To be specific, a time domain offset exists between the start transmission time unit in the at least two first transmission time units and the aligned first transmission time unit. When determining the first transmission time unit corresponding to the control information based on the number of the aligned first transmission time unit, the location information of the first transmission time unit corresponding to the control information, and the length of the first transmission time unit, the determining module 11 may be specifically configured to:

determine a time domain offset between the start transmission time unit in the at least two first transmission time units and the aligned first transmission time unit; and determine the first transmission time unit corresponding to the control information based on the time domain offset, the number of the aligned first transmission time unit, the location information of the first transmission time unit corresponding to the control information, and the length of the first transmission time unit.

Figure 10:
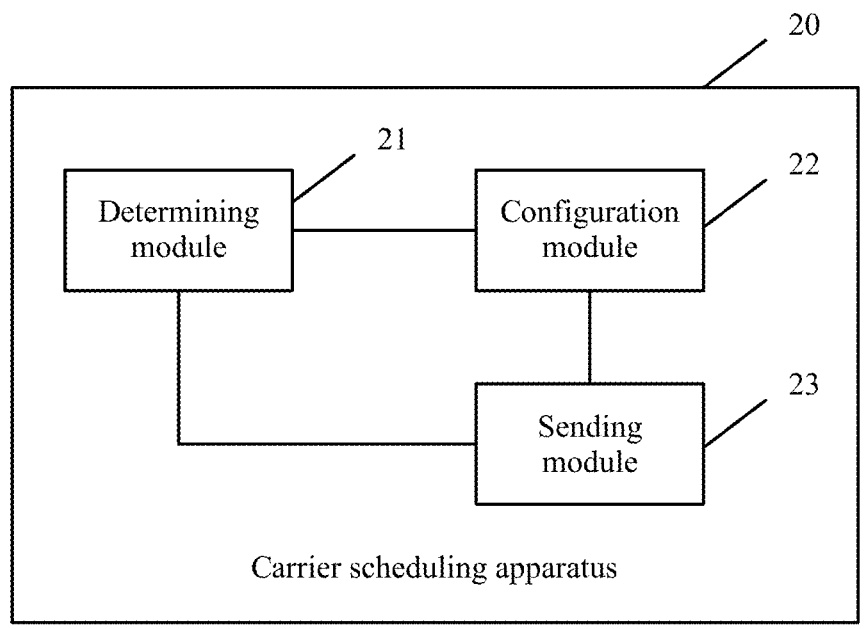
FIG. 10 is a schematic structural diagram of a carrier scheduling apparatus according to an embodiment of the present application.

FIG. 10 is a schematic structural diagram of another carrier scheduling apparatus according to an embodiment of the present application. Specifically, the carrier scheduling apparatus 20 in this embodiment of the present application may be specifically disposed in the foregoing base station. As shown in FIG. 10, the carrier scheduling apparatus 20 in this embodiment of the present application may include a determining module 21 and a configuration module 22.

The determining module 21 is configured to determine downlink control channels corresponding to at least two first transmission time units on a first carrier.

The configuration module 22 is configured to configure control information in each of search spaces of the downlink control channels corresponding to the at least two first transmission time units.

The at least two first transmission time units are scheduled in one second transmission time unit on a second carrier, and the downlink control channels are in a one-to-one correspondence with the first transmission time units. Optionally, a length of the first transmission time unit may be the same as or different from a length of the second transmission time unit.

Optionally, the transmission time units in the at least two first transmission time units may include discrete transmission time units, or may be consecutive transmission time units. The apparatus 20 may further include:

a sending module 23, configured to send configuration information to user equipment, so that the user equipment determines the at least two first transmission time units based on the configuration information.

The configuration information may include a number of each first transmission time unit, or include a relative location of each first transmission time unit in the at least two first transmission time units, or include a location of a start transmission time unit in the at least two first transmission time units, a length of the first transmission time unit, and a total quantity of the first transmission time units, or the like.

Optionally, the transmission time units in the at least two first transmission time units may include discrete transmission time units, and the apparatus 20 may further include: a sending module 23, configured to send configuration information to user equipment, so that the user equipment determines the at least two first transmission time units based on the configuration information.

The configuration information may include a number of each first transmission time unit, a relative location of each first transmission time unit in the at least two first transmission time units, or the like.

Further, optionally, the configuration information may further include information such as an identifier of the first carrier, or an identifier of the second carrier. Optionally, the identifier may be a number of the carrier.

Optionally, the search spaces of the downlink control channels corresponding to the first transmission time units in the at least two first transmission time units may be different and non-overlapping. In other words, a search space of a downlink control channel corresponding to each transmission time unit may be independently configured. Further, the configuration information may further include location information of each first transmission time unit in the at least two first transmission time units. The location information of the first transmission time unit may include a number of the first transmission time unit, a relative location of the first transmission time unit in the at least two first transmission time units, or the like.

Optionally, the search spaces of the downlink control channels corresponding to the first transmission time units in the at least two first transmission time units may be overlapping. In other words, the downlink control channels corresponding to the transmission time units may share one search space. Further, the total quantity of the first transmission time units in the at least two first transmission time units may be a largest quantity of first transmission time units on the first carrier that are scheduled in one second transmission time unit on the second carrier.

Further, optionally, the control information may further indicate location information of a first transmission time unit corresponding to the control information. The location information of the first transmission time unit corresponding to the control information may be a number of the first transmission time unit corresponding to the control information, a quantity of transmission time units between the second transmission time unit to which the control information is corresponding and the first transmission time unit corresponding to the control information, a transmission time length between the second transmission time unit to which the control information is corresponding and the first transmission time unit corresponding to the control information, or the like, so that the user equipment determines, based on the location information, the first transmission time unit corresponding to the control information.

In this embodiment of the present application, when cross-carrier scheduling is configured for the user equipment during which at least two transmission time units on the first carrier are scheduled by using a transmission time unit on the second carrier, the search spaces of the downlink control channels corresponding to the at least two transmission time units are determined, and the downlink control channels corresponding to the at least two transmission time units are determined from the search spaces, so that a plurality of transmission time units on another carrier are scheduled in a cross-carrier manner. This improves transmission resource utilization.

Figure 11:
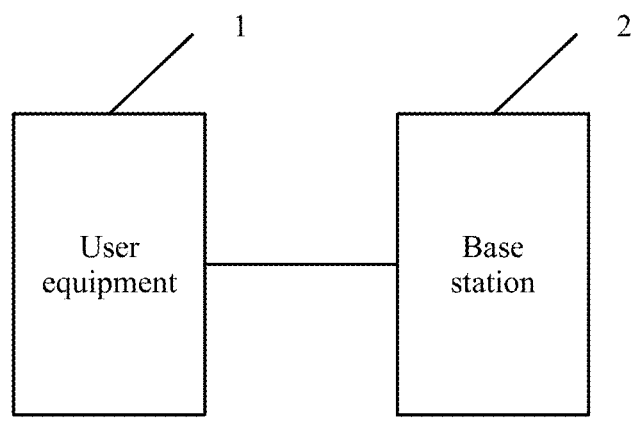
FIG. 11 is a schematic structural diagram of a carrier scheduling system according to an embodiment of the present application.

FIG. 11 is a schematic structural diagram of a carrier scheduling system according to an embodiment of the present application. As shown in FIG. 11, the carrier scheduling system in this embodiment of the present application includes user equipment 1 and a base station 2.

The base station 2 is configured to: determine downlink control channels corresponding to at least two first transmission time units on a first carrier; and configure control information in each of search spaces of the downlink control channels corresponding to the at least two first transmission time units. One second transmission time unit of the at least two first transmission time units on a second carrier is scheduled, and the downlink control channels are in a one-to-one correspondence with the first transmission time units.

The user equipment 1 is configured to: determine the search spaces of the downlink control channels corresponding to the at least two first transmission time units on the first carrier; and obtain, in the search spaces, the downlink control channels corresponding to the at least two first transmission time units. Therefore, the control information is obtained from the downlink control channel, and data is transmitted based on the control information.

Specifically, for the user equipment 1 in this embodiment of the present application, refer to related descriptions of the embodiment corresponding to FIG. 4. For the base station 2 in this embodiment of the present application, refer to related descriptions of the embodiment corresponding to FIG. 8. Details are not described herein again.

Figure 12:
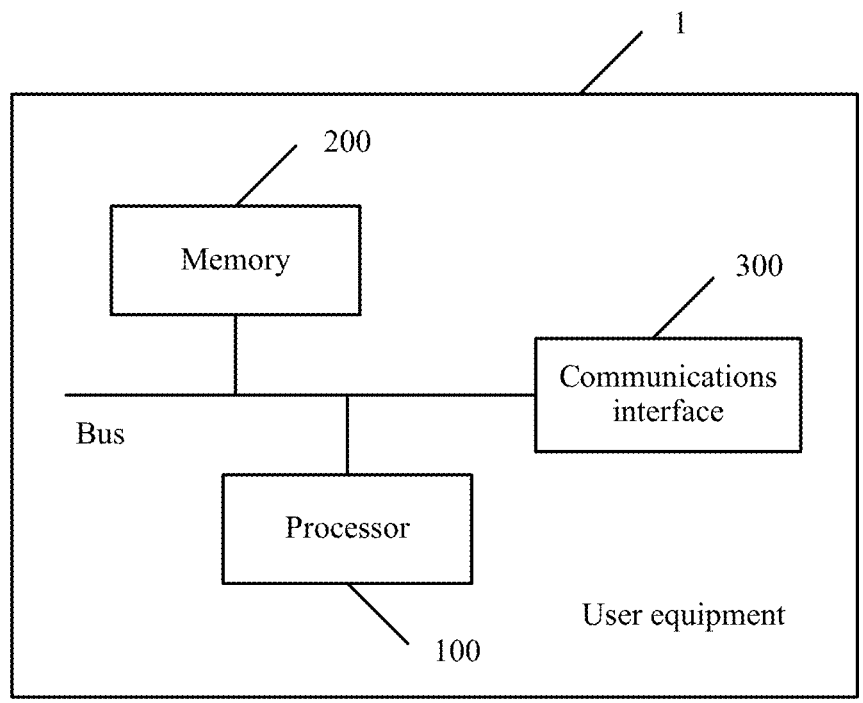
FIG. 12 is a schematic structural diagram of user equipment according to an embodiment of the present application.

FIG. 12 is a schematic structural diagram of user equipment according to an embodiment of the present application. Specifically, as shown in FIG. 12, the user equipment 1 in this embodiment of the present application may include a communications interface 300, a memory 200, and a processor 100, and the processor 100 is separately connected to the communications interface 300 and the memory 200.

The communications interface 300, the memory 200, and the processor 100 may make a data connection to each other by using a bus, or in another manner. Connection by using a bus is described in this embodiment.

The processor 100 may be a central processing unit (CPU), a network processor (NP), or a combination of a CPU and an NP.

The processor 100 may further include a hardware chip. The hardware chip may be an application-specific integrated circuit (ASIC), a programmable logic device (PLD), or a combination thereof. The PLD may be a complex programmable logical device (CPLD), a field-programmable gate array (FPGA), a generic array logic (GAL), or a combination thereof.

The memory 200 may include a volatile memory, for example, a random access memory (RAM); or the memory may include a non-volatile memory, for example, a flash memory, a hard disk drive (HDD), or a solid state drive (SSD); or the memory 200 may include a combination of the foregoing types of memories.

Optionally, the memory 200 may further be configured to store a program instruction. The processor 100 may perform one or more steps or an optional implementation in the embodiment shown in FIG. 4 by invoking the program instruction stored in the memory 200, so that the user equipment implements a function of the foregoing method.

The processor 100 may be configured to:

determine search spaces of downlink control channels corresponding to at least two first transmission time units on a first carrier, where the at least two first transmission time units are scheduled in one second transmission time unit on a second carrier, and the downlink control channels are in a one-to-one correspondence with the first transmission time units; and obtain, in the search spaces, the downlink control channels corresponding to the at least two first transmission time units.

Optionally, before the determining search spaces of downlink control channels corresponding to at least two first transmission time units on a first carrier, the method further includes:

obtaining configuration information, where the configuration information includes a number of each first transmission time unit, or includes a relative location of each first transmission time unit in the at least two first transmission time units, or includes a location of a start transmission time unit in the at least two first transmission time units and a total quantity of the first transmission time units; and determining the at least two first transmission time units based on the configuration information.

Optionally, the at least two first transmission time units are discrete transmission time units, and before the determining search spaces of downlink control channels corresponding to at least two first transmission time units on a first carrier, the method further includes:

obtaining configuration information, where the configuration information includes a number of each first transmission time unit, or a relative location of each first transmission time unit in the at least two first transmission time units; and determining the at least two first transmission time units based on the configuration information.

Optionally, the configuration information may be sent by a base station to the user equipment, and the user equipment receives the configuration information through the communications interface 300; or the configuration information may be determined through pre-negotiation between the user equipment and the base station.

Optionally, the configuration information further includes an identifier of the first carrier, and the determining search spaces of downlink control channels corresponding to at least two first transmission time units on a first carrier includes:

determining the total quantity of the first transmission time units in the at least two first transmission time units based on the configuration information;

obtaining search space offsets of the downlink control channels corresponding to the at least two first transmission time units based on the total quantity, the identifier of the first carrier, and a quantity of candidate sets of downlink control channels that need to be monitored; and determining, based on the search space offsets, the search spaces of the downlink control channels corresponding to the at least two first transmission time units.

Optionally, the search spaces of the downlink control channels corresponding to the first transmission time units in the at least two first transmission time units are different and non-overlapping, and the obtaining search space offsets of the downlink control channels corresponding to the first transmission time units based on the total quantity, the identifier of the first carrier, and a quantity of candidate sets of downlink control channels that need to be monitored includes:

obtaining the search space offsets of the downlink control channels corresponding to the first transmission time units based on location information of the first transmission time units, the total quantity, the identifier of the first carrier, and the quantity of candidate sets of downlink control channels that need to be monitored.

Optionally, the search spaces of the downlink control channels corresponding to the first transmission time units in the at least two first transmission time units are partial overlapping, and the total quantity is a largest quantity of first transmission time units on the first carrier that are scheduled in one second transmission time unit on the second carrier.

Optionally, the downlink control channel includes control information of the user equipment, and the method further includes:

decoding the downlink control channel to obtain the control information of the user equipment, where the control information indicates location information of a first transmission time unit corresponding to the control information;

determining a number of the first transmission time unit that is on the first carrier and that is aligned with a start symbol of a second transmission time unit to which the control information is corresponding; and determining the first transmission time unit corresponding to the control information based on the number of the aligned first transmission time unit, the location information of the first transmission time unit corresponding to the control information, and a length of the first transmission time unit.

Optionally, the determining the first transmission time unit corresponding to the control information based on the number of the aligned first transmission time unit, the location information of the first transmission time unit corresponding to the control information, and a length of the first transmission time unit includes:

determining a time domain offset between the start transmission time unit in the at least two first transmission time units and the aligned first transmission time unit; and determining the first transmission time unit corresponding to the control information based on the time domain offset, the number of the aligned first transmission time unit, the location information of the first transmission time unit corresponding to the control information, and the length of the first transmission time unit.

Figure 13:
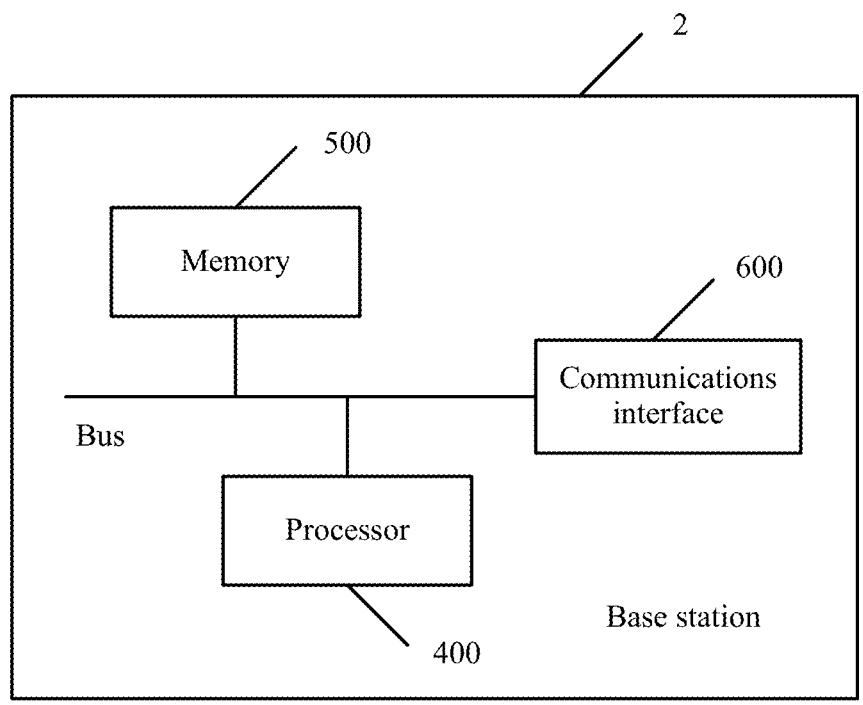
FIG. 13 is a schematic structural diagram of a base station according to an embodiment of the present application.

Further, FIG. 13 is a schematic structural diagram of a base station according to an embodiment of the present application. Specifically, as shown in FIG. 13, the base station 2 in this embodiment of the present application may include a communications interface 600, a memory 500, and a processor 400, and the processor 400 is separately connected to the communications interface 600 and the memory 500.

The communications interface 600, the memory 500, and the processor 400 may make a data connection to each other by using a bus, or in another manner. Connection by using a bus is described in this embodiment.

The processor 400 may be a central processing unit (CPU), a network processor (NP), or a combination of a CPU and an NP.

The processor 400 may further include a hardware chip. The hardware chip may be an application-specific integrated circuit (ASIC), a programmable logic device (PLD), or a combination thereof. The PLD may be a complex programmable logical device (CPLD), a field-programmable gate array (FPGA), a generic array logic (GAL), or a combination thereof.

The memory 500 may include a volatile memory, for example, a random access memory (RAM); or the memory may include a non-volatile memory, for example, a flash memory, a hard disk drive (HDD), or a solid state drive (SSD); or the memory 500 may include a combination of the foregoing types of memories.

Optionally, the memory 500 may further be configured to store a program instruction. The processor 400 may perform one or more steps or an optional implementation in the embodiment shown in FIG. 8 by invoking the program instruction stored in the memory 500, so that the base station implements a function of the foregoing method.

The processor 400 may be configured to:

determine downlink control channels corresponding to at least two first transmission time units on a first carrier, where the at least two first transmission time units are scheduled in one second transmission time unit on a second carrier, and the downlink control channels are in a one-to-one correspondence with the first transmission time units; and configure control information in each of search spaces of the downlink control channels corresponding to the at least two first transmission time units.

Optionally, after the configuring control information in each of search spaces of the downlink control channels corresponding to the at least two first transmission time units, the method further includes:

sending configuration information to user equipment through the communications interface 600, so that the user equipment determines the at least two first transmission time units based on the configuration information.

The configuration information includes a number of each first transmission time unit, or includes a relative location of each first transmission time unit in the at least two first transmission time units, or includes a location of a start transmission time unit in the at least two first transmission time units, a length of the first transmission time unit, and a total quantity of the first transmission time units.

Optionally, the at least two first transmission time units are discrete transmission time units, and after the configuring control information in each of search spaces of the downlink control channels corresponding to the at least two first transmission time units, the method further includes:

sending configuration information to user equipment through the communications interface 600, so that the user equipment determines the at least two first transmission time units based on the configuration information.

The configuration information includes a number of each first transmission time unit, or a relative location of each first transmission time unit in the at least two first transmission time units.

Optionally, the configuration information further includes an identifier of the first carrier.

Optionally, the search spaces of the downlink control channels corresponding to the first transmission time units in the at least two first transmission time units are different and non-overlapping, and the configuration information further includes location information of each first transmission time unit in the at least two first transmission time units.

Optionally, the search spaces of the downlink control channels corresponding to the first transmission time units in the at least two first transmission time units are partial overlapping, and the total quantity is a largest quantity of first transmission time units on the first carrier that are scheduled in one second transmission time unit on the second carrier.

Optionally, the control information may indicate location information of a first transmission time unit corresponding to the control information.

In the foregoing embodiments, the description of each embodiment has respective focuses. For a part that is not described in detail in an embodiment, reference may be made to related descriptions in other embodiments.

In the several embodiments provided in the present application, it should be understood that the disclosed apparatus and method may be implemented in other manners. For example, the described apparatus embodiment is merely an example. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all the modules may be selected based on actual needs to achieve the objectives of the solutions of the embodiments.

In addition, functional modules in the embodiments of the present application may be integrated into one processing module, or each of the modules may exist alone physically, or two or more modules are integrated into one module. The integrated module may be implemented in a form of hardware, or may be implemented in a form of hardware in addition to a software functional module.

When the foregoing integrated module is implemented in a form of a software functional module, the integrated unit may be stored in a computer-readable storage medium. The foregoing software functional module is stored in a storage medium and includes several instructions for instructing a computer device (which may be a personal computer, a server, a network device, or the like) or a processor to perform some of the steps of the methods described in the embodiments of the present application. The foregoing storage medium includes any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of the present application, but not for limiting the present application. Although the present application is described in detail with reference to the foregoing embodiments, person of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:

1. A carrier scheduling method comprising:
    determining, by an apparatus, search spaces of downlink control channels corresponding to at least two first transmission time units on a first carrier, wherein the at least two first transmission time units are scheduled in one second transmission time unit on a second carrier, and the downlink control channels are in a one-to-one correspondence with the first transmission time units; and
    obtaining, by the apparatus, in the search spaces, the downlink control channels corresponding to the at least two first transmission time units.

2. The method according to claim 1, further comprising:
    obtaining, by the apparatus, configuration information, wherein the configuration information comprises a number of each first transmission time unit, or a relative location of each first transmission time unit in the at least two first transmission time units, or a location of a start transmission time unit in the at least two first transmission time units and a total quantity of the first transmission time units; and determining, by the apparatus, the at least two first transmission time units based on the configuration information.

3. The method according to claim 1, wherein the at least two first transmission time units are discrete transmission time units, and wherein the method further comprises:

obtaining, by the apparatus, configuration information, wherein the configuration information comprises a number of each first transmission time unit, or a relative location of each first transmission time unit in the at least two first transmission time units, and determining, by the apparatus, the at least two first transmission time units based on the configuration information.

4. The method according to claim 2, wherein the configuration information further comprises an identifier of the first carrier, and wherein determining the search spaces of the downlink control channels corresponding to the at least two first transmission time units on the first carrier comprises:

determining, by the apparatus, the total quantity of the first transmission time units in the at least two first transmission time units based on the configuration information, obtaining, by the apparatus, search space offsets of the downlink control channels corresponding to the at least two first transmission time units based on the total quantity, the identifier of the first carrier, and a quantity of candidates of downlink control channels that need to be monitored, and determining, by the apparatus, based on the search space offsets, the search spaces of the downlink control channels corresponding to the at least two first transmission time units.

5. The method according to claim 4, wherein the search spaces of the downlink control channels corresponding to the first transmission time units in the at least two first transmission time units are different and non-overlapping, and wherein obtaining the search space offsets of the downlink control channels corresponding to the first transmission time units based on the total quantity, the identifier of the first carrier, and the quantity of the candidates of the downlink control channels that need to be monitored comprises obtaining, by the apparatus, the search space offsets of the downlink control channels corresponding to the first transmission time units based on location information of the first transmission time units, the total quantity, the identifier of the first carrier, and the quantity of candidates of the downlink control channels that need to be monitored.

6. The method according to claim 4, wherein the search spaces of the downlink control channels corresponding to the first transmission time units in the at least two first transmission time units are partial overlapping, and the total quantity is a largest quantity of first transmission time units on the first carrier that are scheduled in one second transmission time unit on the second carrier.

7. An apparatus comprising:

a processor; and a memory coupled with the processor and comprising instructions that, when executed by the processor, cause the apparatus to:

determine search spaces of downlink control channels corresponding to at least two first transmission time units on a first carrier, wherein the at least two first transmission time units are scheduled in one second transmission time unit on a second carrier, and the downlink control channels are in a one-to-one correspondence with the first transmission time units; and obtain, in the search spaces, the downlink control channels corresponding to the at least two first transmission time units.

8. The apparatus according to claim 7, wherein the instructions, when executed by the processor, further cause the apparatus to:

obtain configuration information, wherein the configuration information comprises a number of each first transmission time unit, or a relative location of each first transmission time unit in the at least two first transmission time units, or a location of a start transmission time unit in the at least two first transmission time units, a length of the first transmission time unit, and a total quantity of the first transmission time units; and determine the at least two first transmission time units based on the configuration information.

9. The apparatus according to claim 7, wherein the at least two first transmission time units are discrete transmission time units, and wherein the instructions, when executed by the processor, further cause the apparatus to:

obtain configuration information comprising a number of each first transmission time unit or a relative location of each first transmission time unit in the at least two first transmission time units, and determine the at least two first transmission time units based on the configuration information.

10. The apparatus according to claim 8, wherein the configuration information further comprises an identifier of the first carrier, and wherein the instructions, when executed by the processor, cause the apparatus to determine the search spaces of the downlink control channels corresponding to the at least two first transmission time units on the first carrier comprises:

determine the total quantity of the first transmission time units in the at least two first transmission time units based on the configuration information, obtain search space offsets of the downlink control channels corresponding to the at least two first transmission time units based on the total quantity, the identifier of the first carrier, and a quantity of candidates of downlink control channels that need to be monitored, and determine, based on the search space offsets, the search spaces of the downlink control channels corresponding to the at least two first transmission time units.

11. The apparatus according to claim 10, wherein the search spaces of the downlink control channels corresponding to the first transmission time units in the at least two first transmission time units are different and non-overlapping, and wherein the instructions, when executed by the processor, cause the apparatus to obtain search space offsets of the downlink control channels corresponding to the first transmission time units based on the total quantity, the identifier of the first carrier, and the quantity of candidates of downlink control channels that need to be monitored comprises to obtain the search space offsets of the downlink control channels corresponding to the first transmission time units based on location information of the first transmission time units, the total quantity, the identifier of the first carrier, and the quantity of candidates of downlink control channels that need to be monitored.

12. The apparatus according to claim 10, wherein the search spaces of the downlink control channels corresponding to the first transmission time units in the at least two first transmission time units are partial overlapping, and the total quantity is a largest quantity of first transmission time units on the first carrier that are scheduled in one second transmission time unit on the second carrier.

13. The apparatus according to claim 10,
wherein the downlink control channel comprises control information of a user equipment and
wherein the instructions, when executed by the processor, further cause the apparatus to:
  decode the downlink control channel to obtain the control information of the user equipment, wherein the control information indicates location information of a first transmission time unit corresponding to the control information,
  determine a number of the first transmission time unit that is on the first carrier and that is aligned with a start symbol of a second transmission time unit to which the control information is corresponding, and
  determine the first transmission time unit corresponding to the control information based on the number of the aligned first transmission time unit, the location information of the first transmission time unit corresponding to the control information, and a length of the first transmission time unit.

14. The apparatus according to claim 13, wherein the instructions, when executed by the processor, cause the apparatus to determine the first transmission time unit corresponding to the control information based on the number of the aligned first transmission time unit, the location information of the first transmission time unit corresponding to the control information, and the length of the first transmission time unit comprises:
  determine a time domain offset between the start transmission time unit in the at least two first transmission time units and the aligned first transmission time unit; and
  determine the first transmission time unit corresponding to the control information based on the time domain offset, the number of the aligned first transmission time unit, the location information of the first transmission time unit corresponding to the control information, and the length of the first transmission time unit.

15. An apparatus comprising:
a processor; and
memory coupled with the processor and comprising instructions that, when executed by the processor, cause the apparatus to:
  determine downlink control channels corresponding to at least two first transmission time units on a first carrier, wherein the at least two first transmission time units are scheduled in one second transmission time unit on a second carrier, and the downlink control channels are in a one-to-one correspondence with the first transmission time units, and
  configure control information in each of search spaces of the downlink control channels corresponding to the at least two first transmission time units.

16. The apparatus according to claim 15, further comprising:
a first transmitter configured to send configuration information to a terminal, wherein the configuration information comprises a number of each first transmission time unit, or a relative location of each first transmission time unit in the at least two first transmission time units, or a location of a start transmission time unit in the at least two first transmission time units and a total quantity of the first transmission time units.

17. The apparatus according to claim 15,
wherein the at least two first transmission time units are discrete transmission time units, and
wherein the apparatus further comprises a second transmitter configured to send configuration information to a terminal after configuring the control information in each of the search spaces of the downlink control channels corresponding to the at least two first transmission time units, and wherein the configuration information comprises a number of each first transmission time unit, or a relative location of each first transmission time unit in the at least two first transmission time units.

18. The apparatus according to claim 16, wherein the configuration information further comprises an identifier of the first carrier.

19. The apparatus according to claim 18, wherein the search spaces of the downlink control channels corresponding to the first transmission time units in the at least two first transmission time units are different and non-overlapping, and the configuration information further comprises location information of each first transmission time unit in the at least two first transmission time units.

20. The apparatus according to claim 18, wherein the search spaces of the downlink control channels corresponding to the first transmission time units in the at least two first transmission time units are partial overlapping, and the total quantity is a largest quantity of first transmission time units on the first carrier that are scheduled in one second transmission time unit on the second carrier.

* * * * *